United States Patent
Haraguchi et al.

(10) Patent No.: US 9,599,015 B2
(45) Date of Patent: Mar. 21, 2017

(54) DEVICE FOR UTILIZING WASTE HEAT FROM ENGINE

(71) Applicant: SANDEN CORPORATION, Isesaki-shi (JP)

(72) Inventors: Tomonori Haraguchi, Isesaki (JP); Hajime Makino, Isesaki (JP); Hiroyuki Nagai, Yokohama (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 129 days.

(21) Appl. No.: 14/413,651

(22) PCT Filed: Jul. 4, 2013

(86) PCT No.: PCT/JP2013/068370
§ 371 (c)(1),
(2) Date: Jan. 8, 2015

(87) PCT Pub. No.: WO2014/010505
PCT Pub. Date: Jan. 16, 2014

(65) Prior Publication Data
US 2015/0176482 A1    Jun. 25, 2015

(30) Foreign Application Priority Data
Jul. 9, 2012 (JP) .................. 2012-153374

(51) Int. Cl.
*F01K 23/10* (2006.01)
*F01K 13/02* (2006.01)
(Continued)

(52) U.S. Cl.
CPC .......... *F02B 39/085* (2013.01); *F01K 23/065* (2013.01); *F02D 21/08* (2013.01);
(Continued)

(58) Field of Classification Search
CPC .... F02B 39/085; F01K 23/065; F01K 23/101; F01K 23/14; F02D 21/08;
(Continued)

(56) References Cited

U.S. PATENT DOCUMENTS

| | | | | |
|---|---|---|---|---|
| 8,544,270 B2* | 10/2013 | Kasuya | ................. | F01K 23/065 60/670 |
| 2006/0168963 A1* | 8/2006 | Sato | ...................... | F01K 23/065 60/645 |

(Continued)

FOREIGN PATENT DOCUMENTS

| CN | 101387241 | 3/2009 |
|---|---|---|
| CN | 102418622 | 4/2012 |

(Continued)

OTHER PUBLICATIONS

Machine translation to Kasuya Junichiro (Pub. No. JP-2010-065587A), published on Mar. 25, 2010.*

(Continued)

*Primary Examiner* — Thai Ba Trieu
(74) *Attorney, Agent, or Firm* — Cozen O'Connor (57) ABSTRACT

A device for utilizing waste heat from an engine, which is provided with a Rankine cycle device having an expander bypass passage and a bypass valve that opens and closes the expander bypass passage, and transmits the output torque Tr of the Rankine cycle device to the engine, estimates the output torque Tr of the Rankine cycle device accurately. An output calculation part includes a torque estimation portion that estimates the torque of an expander. The torque estimation portion has a first torque estimation equation corresponding to an opening position of a bypass valve, and a second torque estimation equation corresponding to a closed position of the bypass valve. The output calculation part calculates an output torque Tr of a Rankine cycle device, (Continued)

based on a torque estimated value by the first or second torque estimation equation.

8 Claims, 6 Drawing Sheets

(51) Int. Cl.
    *F01K 23/06*     (2006.01)
    *F02B 39/08*     (2006.01)
    *F02G 5/00*     (2006.01)
    *F02D 21/08*     (2006.01)
    *F01P 3/20*     (2006.01)

(52) U.S. Cl.
    CPC ............... *F02G 5/00* (2013.01); *F01P 3/20* (2013.01); *F02G 2260/00* (2013.01); *Y02T 10/166* (2013.01)

(58) Field of Classification Search
    CPC .......... F02G 5/00; F02G 2260/00; F01P 3/20; Y02T 10/166
    USPC ........................................... 60/670, 660, 618
    See application file for complete search history.

(56) References Cited

U.S. PATENT DOCUMENTS

| | | | |
|---|---|---|---|
| 2009/0071156 A1* | 3/2009 | Nishikawa | F02G 5/02 60/660 |
| 2011/0192163 A1* | 8/2011 | Kasuya | F01K 23/065 60/624 |
| 2014/0165562 A1* | 6/2014 | Nagai | F01K 23/065 60/618 |
| 2015/0033743 A1* | 2/2015 | Wada | F01K 23/065 60/670 |
| 2015/0033744 A1* | 2/2015 | Wada | F01K 23/065 60/670 |
| 2015/0084346 A1* | 3/2015 | Tomigashi | F01K 13/02 60/660 |
| 2016/0076403 A1* | 3/2016 | Haraguchi | F01K 23/065 60/618 |

FOREIGN PATENT DOCUMENTS

| | | |
|---|---|---|
| JP | 2008-209085 | 9/2008 |
| JP | 2010-65587 | 3/2010 |
| JP | 2010-101283 | 5/2010 |
| JP | 2010-229843 | 10/2010 |
| JP | 2010-229844 | 10/2010 |
| JP | 2012-117410 | 6/2012 |

OTHER PUBLICATIONS

Machine translation to Tsuchino Kazunori et al. (Pub. No. JP-2012-117410A),published on Jun. 21, 2012.*
Machine translation to Kobayashi Hideo et al. (Pub. No. JP-2010-101283A),published on May 6, 2010.*
Machine translation to Kasuya Junichiro et al. (Pub. No. JP-2010-229843A),published on Oct. 14, 2010.*

* cited by examiner

DEVICE FOR UTILIZING WASTE HEAT FROM ENGINE

RELATED APPLICATIONS

This is a U.S. National Phase Application under 35 USC 371 of International Application PCT/JP2013/068370 filed on Jul. 4, 2013.

This application claims the priority of Japanese application no. 2012-153374 filed Jul. 9, 2012, the entire content of which is hereby incorporated by reference.

TECHNICAL FIELD

The present invention relates to a device for utilizing waste heat from an engine, and in particular, relates to a device for utilizing waste heat from an engine, which is provided with a Rankine cycle device that recovers the waste heat of the engine and regenerates the waste heat as power by an expander.

BACKGROUND ART

There has been known a waste heat utilization device that is provided with a Rankine cycle device that recovers waste heat of an engine as heat energy and converts it to power and which assists the output of the engine by transmitting the output of a Rankine cycle thereof to the engine. In order to properly control the output of the engine in a vehicle equipped with such a waste heat utilization device, there is a need to accurately monitor the output torque Tr of the Rankine cycle device.

As a method of monitoring the output torque Tr of the Rankine cycle device, there is a technique disclosed in, for example, Patent Document 1. In the technique described in this Patent Document 1, the torque of an expander is estimated as the output torque Tr of the Rankine cycle device on the basis of a refrigerant pressure being a high pressure on the upstream side of the expander and a refrigerant pressure being a low pressure on the downstream side of the expander.

REFERENCE DOCUMENT LIST

Patent Document

Patent Document 1: Japanese Patent Application Laid-open Publication No. 2010-229843

SUMMARY OF THE INVENTION

Problems to be Solved by the Invention

Some Rankine cycle devices, each used as a waste heat utilization device for an engine, include one provided with an expander bypass passage that allows a refrigerant to circulate while bypassing an expander, and a bypass valve that opens and closes this expander bypass passage. In such a Rankine cycle device, the refrigerant is circulated while bypassing the expander by opening the bypass valve as needed.

The above conventional technique is intended for a case in which the torque of the expander is estimated based on a high refrigerant pressure on the upstream side of the expander and a low refrigerant pressure on the downstream side thereof, and the refrigerant pressure difference between the high pressure side and the low pressure side is relatively large. Therefore, it cannot be used as a waste heat utilization device equipped with the Rankine cycle device having the expander bypass passage and the bypass valve as it is. This is because there is a concern that since there is almost no refrigerant pressure difference between the high pressure side and the low pressure side in the state in which the bypass valve is open, an estimation error in the torque (i.e., the output of the Rankine cycle) of the expander increases.

The present invention has been made in view of such circumstances and aims to, in a device for utilizing waste heat from an engine, which is provided with a Rankine cycle device having an expander bypass passage and a bypass valve that opens and closes the expander bypass passage, and which is configured to transmit the output torque Tr of the Rankine cycle device to the engine, estimate the output torque Tr of the Rankine cycle device accurately regardless of whether the state of the bypass valve is open or closed, thereby enabling appropriate output control of the engine.

Means for Solving the Problems

A device for utilizing waste heat from an engine according to one aspect of the present invention includes: a Rankine cycle device provided in a circulation passage of a refrigerant with an evaporator that evaporates the refrigerant by heating the refrigerant by the waste heat of the engine, an expander that expands the refrigerant that has passed through the evaporator to thereby generate power, a condenser that condenses the refrigerant which has passed through the expander, and a pump that delivers the refrigerant which has passed through the condenser to the evaporator, and provided with an expander bypass passage that allows the refrigerant to circulate while bypassing the expander, and a bypass valve that opens and closes the expander bypass passage; a transmission mechanism that transmits an output torque Tr of the Rankine cycle device to the engine; and a calculation processing unit that calculates the output torque Tr of the Rankine cycle device and outputs the calculated output of the Rankine cycle device to an engine control unit that performs output control of the engine. The calculation processing unit has: a first torque estimation portion that estimates a torque of the expander in a state in which the bypass valve is open, based on a refrigerant pressure on the high pressure side of the Rankine cycle device and a refrigerant pressure on the low pressure side thereof; and a second torque estimation portion that estimates a torque of the expander in a state in which the bypass valve is closed, based on the refrigerant pressure on the high pressure side of the Rankine cycle device and the refrigerant pressure on the low pressure side thereof. The output torque Tr of the Rankine cycle device is calculated based on the torque estimated value by the first torque estimation portion and the torque estimated value by the second torque estimation portion.

Furthermore, a device for utilizing waste heat from an engine according to another aspect of the present invention includes: a Rankine cycle device provided in a circulation passage of a refrigerant with an evaporator that evaporates the refrigerant by heating the refrigerant by the waste heat of the engine, an expander that expands the refrigerant which has passed through the evaporator to thereby generate power, a condenser that condenses the refrigerant which has passed through the expander, and a pump that delivers the refrigerant which has passed through the condenser to the evaporator, and provided with an expander bypass passage that allows the refrigerant to circulate while bypassing the expander, and a bypass valve that opens and closes the expander bypass passage; a transmission mechanism that transmits an output torque Tr of the Rankine cycle device to the engine; and a calculation processing unit that calculates the output torque Tr of the Rankine cycle device, based on a torque of the expander and outputs the calculated output torque Tr of the Rankine cycle device to an engine control unit that performs output control of the engine. The calculation processing unit has a torque estimation portion that estimates a torque of the expander, based on a refrigerant pressure on the high pressure side of the Rankine cycle device and a refrigerant pressure on the low pressure side thereof, and limits a minimum value of the estimated torque of the expander.

Effects of the Invention

According to the waste heat utilization device for the engine, the calculation processing unit that calculates the output torque Tr of the Rankine cycle device and outputs the calculated output to the engine control unit has the first torque estimation portion that estimates the torque of the expander in the state in which the bypass valve for opening and closing the expander bypass passage is open, and the second torque estimation portion that estimates the torque of the expander in the state in which the bypass valve is closed. Therefore, the torque of the expander, and ultimately, the output torque Tr of the Rankine cycle device, operated in different states, that is, the bypass valve is open or closed, can be estimated accurately, and appropriate output control of the engine by the engine control unit is possible.

According to the waste heat utilization device for the engine, the calculation processing unit that calculates the output torque Tr of the Rankine cycle device and outputs the calculated output to the engine control unit has the torque estimation portion that estimates the torque of the expander, based on the refrigerant pressures on the high and low pressure sides of the Rankine cycle device and limits the minimum value of the estimated torque of the expander. Therefore, particularly when the difference between the refrigerant pressure on the high pressure side and the refrigerant pressure on the low pressure side is small, such as in the state in which the bypass valve is open and immediately after the bypass valve is closed, it is possible to prevent the torque estimated value of the expander from being estimated to be excessively small. Thus, regardless of the open or closed state of the bypass valve, the output of the Rankine cycle can be estimated accurately, and the appropriate output control of the engine by the engine control unit is possible.

MODE FOR CARRYING OUT THE INVENTION

Embodiments of the present invention will hereinafter be described with reference to the accompanying drawings.

Figure 1:
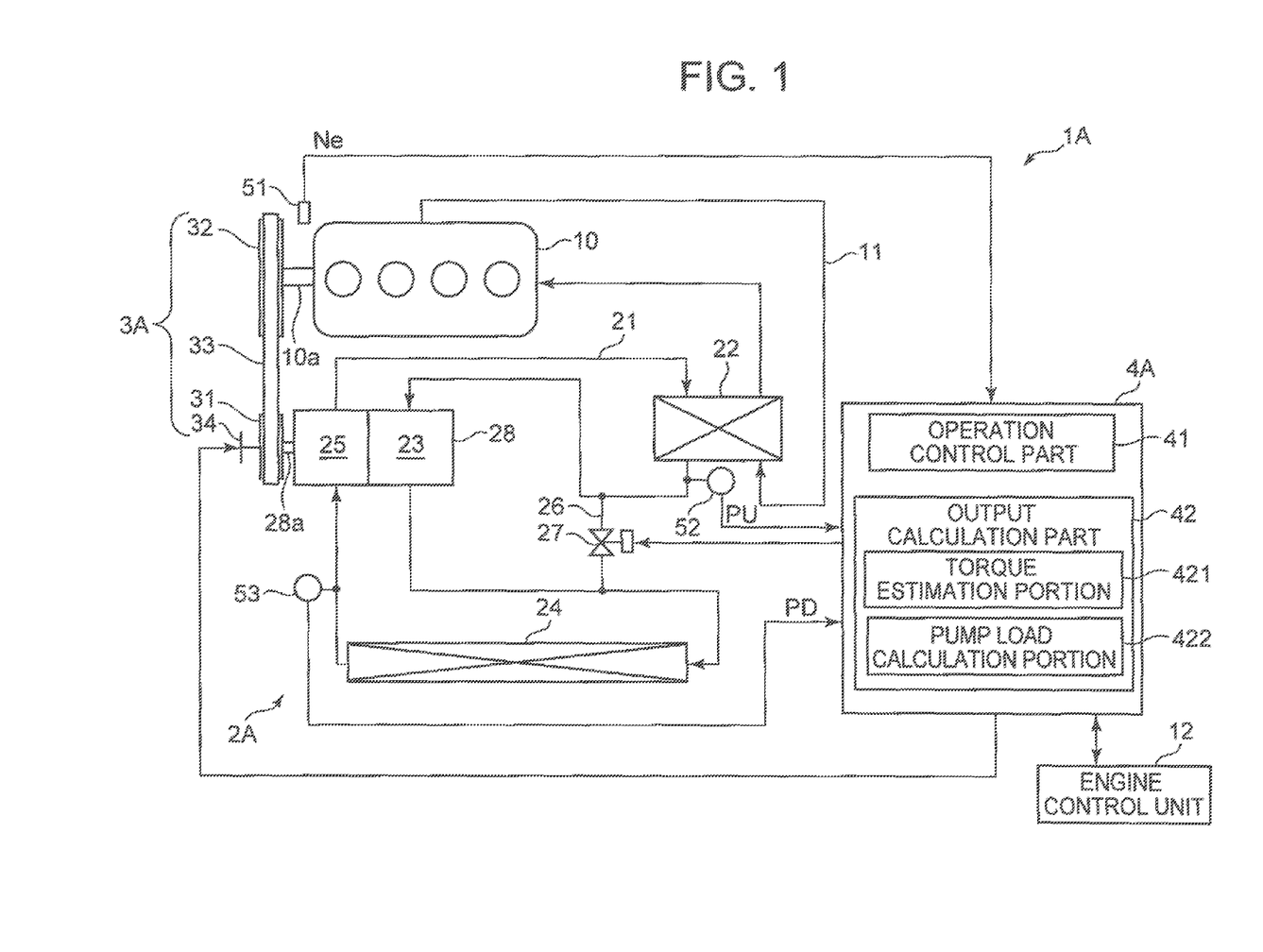
FIG. 1 is a diagram illustrating a schematic structure of a device for utilizing waste heat according to a first embodiment of the present invention.

FIG. 1 illustrates a schematic structure of a device 1A for utilizing waste heat according to a first embodiment of the present invention. This waste heat utilization device 1A is a device for utilizing waste heat from an engine 10, which device is mounted on a vehicle and uses the waste heat of the engine 10 of the vehicle by recovering the waste heat, and is configured to include a Rankine cycle device 2A, a transmission mechanism 3A that transmits the output of the Rankine cycle device 2A to the engine 10, and a control unit 4A that controls the waste heat utilization device 1A.

The engine 10 is a water-cooled internal combustion engine and is cooled by cooling water flowing through a cooling water circulation passage 11. An evaporator 22 of the Rankine cycle device 2A, described below, is disposed in the cooling water circulation passage 11, and a radiator (not shown in the figure) is further disposed on the downstream side of the evaporator 22. The cooling water having absorbed heat from the engine 10 is cooled by being heat-exchanged with the refrigerant of the Rankine cycle device 2A when passing through the evaporator 22 and further heat-exchanged with the outside air when passing through the radiator, and is supplied to the engine 10 again.

The Rankine cycle device 2A recovers the waste heat of the engine 10 from the cooling water of the engine 10 and converts it into power to output (regenerated as power). The Rankine cycle device 2A has a circulation passage 21 of the refrigerant. The evaporator 22, an expander 23, a condenser 24 and a pump 25 are provided in the circulation passage 21 in this order. Furthermore, the Rankine cycle device 2A has, in addition to the circulation passage 21, an expander bypass passage 26 that allows the refrigerant to circulate while bypassing the expander 23, and a bypass valve 27 that opens and closes the expander bypass passage 26. The operation of the bypass valve 27 is controlled by the control unit 4A.

The evaporator 22 is a heat exchanger that heats and evaporates (vaporizes) the refrigerant by performing the heat exchange between the cooling water having absorbed heat from the engine 10 and the refrigerant. The expander 23 is a scroll type expander that generates a driving force by expanding the refrigerant brought to overheated vapor by being heated by the evaporator 22 to convert into rotational energy. The condenser 24 is a heat exchanger that performs the heat exchange between the refrigerant which has passed through the expander 23 and the outside air to thereby cool and condense (liquefy) the refrigerant. The pump 25 is a mechanical pump that delivers the refrigerant liquefied by the condenser 24 to the evaporator 22. Furthermore, the refrigerant liquefied by the condenser 24 is delivered to the evaporator 22 by the pump 25 to be circulated through the circulation passage 21 (i.e., the above respective elements of the Rankine cycle device 2A).

Here, in the present embodiment, the expander 23 and the pump 25 are configured as a "pump integrated expander 28" integrated through a common rotary shaft 28a. That is, the rotary shaft 28a of the pump integrated expander 28 has a function as an output shaft of the expander 23 and a function as a drive shaft of the pump 25. Then, the Rankine cycle device 2A is first started by allowing the engine 10 to drive the pump 25 (pump part in the pump integrated expander 28) and thereafter operated by, when the expander 23 (expander part of the pump integrated expander 28) generates a sufficient driving force, driving the pump 25 by the driving force generated by the expander 23.

The transmission mechanism 3A transmits the torque (shaft torque) of the pump integrated expander 28 to the engine 10 as the output torque Tr of the Rankine cycle device 2A. The transmission mechanism 3A has a pulley 31 attached to the rotary shaft 28a of the pump integrated expander 28, a crank pulley 32 attached to a crank shaft 10a of the engine 10, and a belt 33 wound around the pulley 31 and the crank pulley 32. Furthermore, an electromagnetic clutch 34 is provided between the rotary shaft 28a of the pump integrated expander 28 and the pulley 31. By turning on (engagement) or off (disengagement) the electromagnetic clutch 34, the power can be transferred or cut off between the engine 10 and the Rankine cycle device 2A (specifically, pump integrated expander 28). The operation of the electromagnetic clutch 34 is controlled by the control unit 4A.

The control unit 4A includes an operation control part 41 that controls the operation of the Rankine cycle device 2A, and an output calculation part 42 that calculates the output torque Tr of the Rankine cycle device 2A. Furthermore, the control unit 4A is input with measurement signals from various sensors, such as a rotational speed sensor 51 that measures a rotational speed Ne of the engine 10, a first pressure sensor 52 that measures a refrigerant pressure PU on the high pressure side of the Rankine cycle device 2A, a second pressure sensor 53 that measures a refrigerant pressure PD on the low pressure side of the Rankine cycle device 2A.

Then, the control unit 4A controls the operation of the Rankine cycle device 2A and calculates the output torque Tr of the Rankine cycle device 2A, and outputs the calculated output torque Tr of the Rankine cycle device 2A to an engine control unit 12 that performs output control of the engine 10.

Accordingly, in the present embodiment, such a control unit 4A corresponds to a "calculation processing unit" of the present invention.

Here, the refrigerant pressure PU on the high pressure side refers to the pressure of the refrigerant in a section from the pump 25 (discharge side thereof) to the expander 23 (inlet side thereof) through the evaporator 22 in the circulation passage 21. The refrigerant pressure PD on the low pressure side refers to the pressure of the refrigerant in a section from the expander 23 (outlet side thereof) to the pump 25 (intake side thereof) through the condenser 24 in the circulation passage 21. In the present embodiment, the first pressure sensor 52 measures a refrigerant pressure immediately after having exited the evaporator 22 as the refrigerant pressure PU on the high pressure side. The second pressure sensor 53 measures a refrigerant pressure between the condenser 24 and the pump 25 as the refrigerant pressure PD on the low pressure side.

For example, when the engine 10 is started, the operation control part 41 engages the electromagnetic clutch 34 and drives the pump 25 (pump part in the pump integrated expander 28) by the engine 10 to thereby operate the Rankine cycle device 2A. Furthermore, the operation control part 41 opens the bypass valve 27 as needed (e.g., when heating of the refrigerant in the evaporator 22 is insufficient) to thereby bypass the expander 23 to allow the refrigerant to flow therethrough.

In a state in which the bypass valve 27 is closed, the expander 23 is operated so that the refrigerant flows through the expander 23 (expander portion in the pump integrated expander 28). Then, when the expander 23 is operated and starts to generate a driving force, part of the driving force generated by the expander 23 drives the pump 25, and its remaining driving force is transmitted to the engine 10 through the transmission mechanism 3A to assist the output (driving force) of the engine 10. Furthermore, the operation control part 41 disengages the electromagnetic clutch 34 when, for example, a stop request of the engine 10 is generated.

The output calculation part 42 calculates the torque of the pump integrated expander 28 as the output torque Tr of the Rankine cycle device 2A. The output calculation part 42 includes a torque estimation portion 421 that estimates a torque Tex of the expander 23 (expander part of the pump integrated expander 28), and a pump load calculation portion 422 that calculates a load torque $T_{PL}$ for driving the pump 25 (pump part in the pump integrated expander 28). Furthermore, the output calculation part 42 subtracts the load torque $T_{PL}$ of the pump 25 calculated by the pump load calculation portion 422 from the torque Tex of the expander 23 estimated by the torque estimation portion 421 to calculate the output torque Tr of the Rankine cycle device 2A. The calculated output torque Tr of the Rankine cycle device 2A is output from the output calculation part 42 or an output part (not shown) of the control unit 4A to the engine control unit 12.

The torque estimation portion 421 estimates the torque Tex of the expander 23 on the basis of the refrigerant pressure PU on the high pressure side, the refrigerant pressure PD on the low pressure side and the rotational speed Nex (i.e., rotational speed Npex of the pump integrated expander 28) of the expander 23. Here, the rotational speed Nex (=rotational speed Npex of the pump integrated expander 28=rotational speed Np of the pump 25) of the expander 23 is calculated based on the rotational speed Ne of the engine 10 and a pulley ratio between the pulley 31 and the crank pulley 32.

In the present embodiment, the torque estimation portion 421 has two torque estimation equations, that is, a first torque estimation equation corresponding to the state in which the bypass valve 27 is open, and a second torque estimation equation corresponding to the state in which the bypass valve 27 is closed. The torque estimation portion 421 has the two torque estimation equations in this way because it is difficult to estimate the torque of the expander 23 by one torque estimation equation since the amount of refrigerant flowing into the expander 23 is significantly different in the state in which the bypass valve 27 is open and in the state in which the bypass valve 27 is closed.

Thus, the torque estimation portion 421 functions as a "first torque estimation portion" in the present invention when the torque of the expander 23 is estimated (calculated) using the above first torque estimation equation, and functions as a "second torque estimation portion" in the present invention when the torque of the expander 23 is estimated (calculated) using the above second torque estimation equation.

In the following description, a value determined by the above first torque estimation equation is referred to as a "torque estimated value Tex1 by the first torque estimation equation", and a value determined by the above second torque estimation equation is referred to as a "torque estimated value Tex2 by the second torque estimation equation".

In the present embodiment, the above first torque estimation equation is represented by the following equation (1), and the above second torque estimation equation is represented by the following equation (2):

$$Tex1 = -M_1 \cdot PU + M_2 \cdot PD - M_3 \cdot Nex - K_1 \quad (1)$$

$$Tex2 = M_4 \cdot PU - M_5 \cdot PD - M_6 \cdot Nex - K_2 \quad (2)$$

Of course, using a difference ΔP (=PU−PD, and may simply be referred to as a "refrigerant pressure difference" below) between the refrigerant pressure PU on the high pressure side and the refrigerant pressure PD on the low pressure side, the above first torque estimation equation may be represented as the following equation (1)', and the above second torque estimation equation may be represented as the following equation (2)':

$$Tex1 = -M_7 \cdot (PU-PD) - M_8 \cdot Nex - K_3 \quad (1)'$$

$$Tex2 = M_9 \cdot (PU-PD) - M_{10} \cdot Nex - K_4 \quad (2)'$$

where $(-M_1)$, $M_2$, $(-M_3)$, $M_4$, $(-M_5)$, $(-M_6)$, $(-M_7)$, $(-M_8)$, $M_9$ and $(-M_{10})$ are coefficients, and $(-K_1)$, $(-K_2)$, $(-K_3)$ and $(-K_4)$ are constants.

Figure 2:
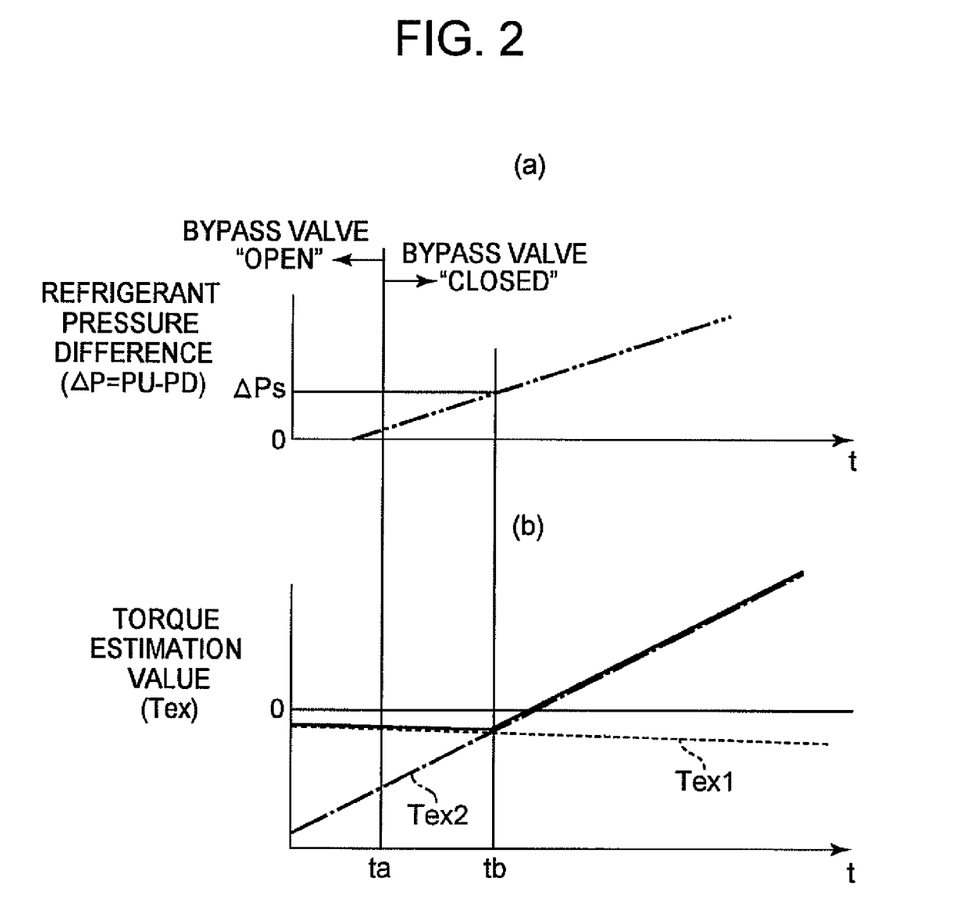
FIG. 2 is a diagram illustrating an example of an estimation result of torque of an expander.

FIG. 2 illustrates an example of an estimation result of the torque of the expander 23 by the torque estimation portion 421. The refrigerant pressure difference ΔP (=PU−PD) between the high pressure side of the Rankine cycle device 2A and the low pressure side thereof is indicated by a two-dot chain line in FIG. 2 (a). Furthermore, the torque estimated value Tex1 by the above first torque estimation equation (above equation (1) or (1)') is indicated by a broken line in FIG. 2 (b). The torque estimated value Tex2 by the above second torque estimation equation (above equation (2) or (2)') is indicated by a dashed line.

As illustrated in FIG. 2 (b), the torque estimated value Tex1 by the above first torque estimation equation is a "negative" value and tends to be smaller as the refrigerant pressure difference ΔP becomes larger. This is in consideration of the fact that since the expander 23 substantially generates no power in the state in which the bypass valve 27 is open, the expander 23 becomes the load of the engine 10.

On the other hand, the torque estimated value Tex2 by the above second torque estimation equation tends to be larger as the refrigerant pressure difference ΔP becomes larger. This is in consideration of the fact that in the state in which the bypass valve 27 is closed, the power generated by the expander 23 also becomes larger as the refrigerant pressure difference ΔP becomes larger.

Here, according to the open or closed state of the bypass valve 27, the torque estimation portion 421 may estimate the torque of the expander 23 by simply switching the above first torque estimation equation and the above second torque estimation equation. It is thus possible to accurately estimate the torque of the expander in both cases in which the bypass valve is open and closed. That alone will, however, result in the possibility that, as illustrated in FIG. 2 (b), the torque estimated value immediately after the bypass valve 27 is closed, in particular becomes excessively small, and an estimation error cannot be reduced sufficiently. This is because the above second torque estimation equation is principally adjusted in such a manner that the torque in a state in which the refrigerant pressure difference ΔP is large to a certain extent and the expander 23 is generating power can be estimated accurately. Therefore, in order to avoid such a situation, the torque estimation portion 421 (or output calculation part 42) selects (determines) the larger one of the torque estimated value Tex1 by the above first estimation equation and the torque estimated value Tex2 of the expander 23 by the above second torque estimation equation as the torque Tex of the expander 23.

As a result, as indicated by a thick line in FIG. 2 (b), while the bypass valve 27 is open and immediately after the bypass valve 27 is closed (in other words, while the refrigerant pressure difference ΔP is less than a predetermined value ΔPs (>0)), the torque estimated value Tex1 by the above first torque estimation equation is selected as the torque Tex of the expander 23. When the bypass valve 27 is closed and the above pressure difference ΔP reaches the above predetermined value ΔPs or more (time tb), the torque estimated value Tex2 by the above second torque estimation equation is selected as the torque Tex of the expander 23.

That is, the estimated torque Tex of the expander 23 is made not to fall below a "negative" predetermined value (torque estimated value at the time tb when the refrigerant pressure difference ΔP=ΔPs here). It can be said that the torque estimation portion 421 (or output calculation part 42) limits the minimum value of the torque estimated value of the expander 23. Thus, as well as the open state of the bypass valve, an increase in the estimation error of the torque of the expander immediately after the bypass valve is closed, specifically, an excessive decrease in the torque estimated value of the expander 23 as compared with an actual torque is reduced.

The pump load calculation portion 422 calculates the load torque $T_{PL}$ of the pump 25, based on the refrigerant pressure difference ΔP and the rotational speed Np of the pump 25. This will be specifically described below.

Generally, power for rotating the pump is represented by the following equation:

(Consumption power $W\_pump$ of pump)=(pump mechanical efficiency $\eta\_pump$)×(fore and aft refrigerant enthalpy difference Δh of pump at adiabatic change)×(refrigerant flow rate $Qr$)

Here, the fore and aft refrigerant enthalpy difference Δh of the pump becomes greater as the fore and aft refrigerant pressure difference in the pump increases. Furthermore, the refrigerant flow rate Qr increases as the rotational speed of the pump increases. Accordingly, the torque for operating the pump 25, i.e., the load torque $T_{PL}$ increases as the refrigerant pressure difference ΔP increases and/or the rotational speed Np of the pump 25 becomes high.

The pump load calculation portion 422 in the present embodiment has the load characteristics (map) of the pump 25 associated with the refrigerant pressure difference ΔP, the rotational speed Np of the pump 25 and the load torque $T_{PL}$ of the pump 25, and calculates the load torque $T_{PL}$ of the pump 25 by referring to the load characteristics (map) of the pump 25, based on the refrigerant pressure difference ΔP and the rotational speed Np of the pump 25.

Then, the output calculation part 42 subtracts the load torque $T_{PL}$ of the pump 25 calculated by the pump load calculation portion 422 from the torque Tex (the larger one of the torque estimated value Tex1 by the above first torque estimation equation and the torque estimated value Tex2 of the expander 23 by the above second torque estimation equation) of the expander 23 estimated by the torque estimation portion 421 to calculate a torque Tpex of the pump integrated expander 28, i.e., the output torque Tr of the Rankine cycle device 2A.

Figure 3:
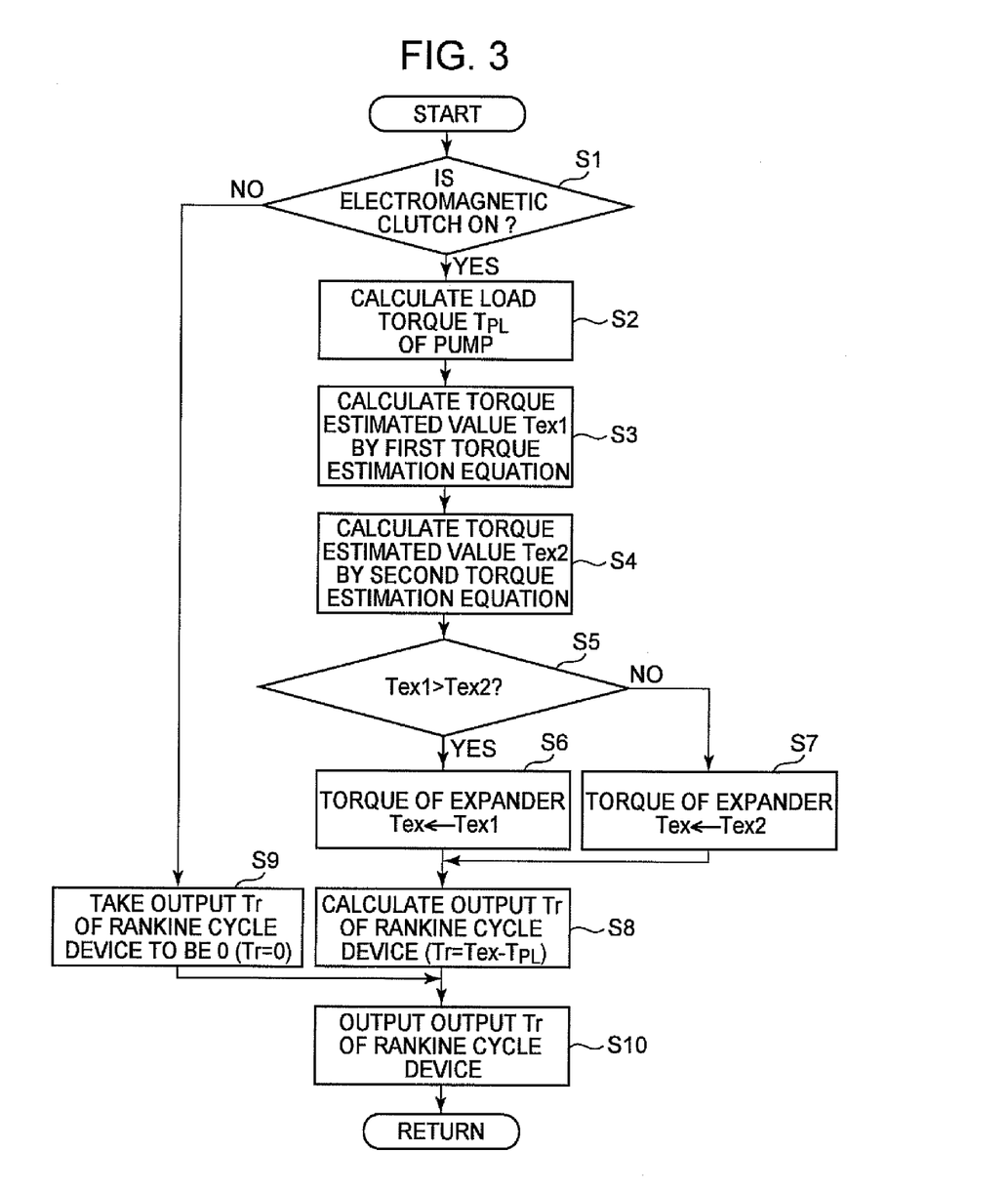
FIG. 3 is a flowchart illustrating an example of a process for calculating the output of a Rankine cycle device.

FIG. 3 is a flowchart illustrating a process for calculating the output torque Tr of the Rankine cycle device 2A, which is executed by the control unit 4A (output calculation part 42). This process is repeatedly executed at every predetermined time, for example.

In FIG. 3, in Step S1, it is determined whether the electromagnetic clutch 34 is ON. If the electromagnetic clutch 34 is ON, the process proceeds to Step S2.

In Step S2, the load torque $T_{PL}$ of the pump 25 (i.e., pump part in the pump integrated expander 28) is calculated. Specifically, as described above, the load torque $T_{PL}$ of the pump 25 is calculated by referring to the load characteristics (map) of the pump 25, based on the refrigerant pressure difference ΔP and the rotational speed Np (=rotational speed Npex of the pump integrated expander 28) of the pump 25.

In Step S3, the torque estimated value Tex1 of the expander 23 (i.e., expander part of the pump integrated expander 28) is calculated by the above first torque estimation equation, based on the refrigerant pressure PU on the high pressure side, the refrigerant pressure PD on the low pressure side, and the rotational speed Nex (=rotational speed Npex of the pump integrated expander 28) of the expander 23.

In Step S4, the torque estimated value Tex2 of the expander 23 is calculated by the above second torque estimation equation, based on the refrigerant pressure PU on the high pressure side, the refrigerant pressure PD on the low pressure side, and the rotational speed Nex (=rotational speed Npex of the pump integrated expander 28) of the expander 23.

In Step S5, the torque estimated value Tex1 by the above first torque estimation equation and the torque estimated value Tex2 by the above second torque estimation equation are compared. Then, if Tex1>Tex2 or more, the process proceeds to Step S6. If Tex1≤Tex2, the process then proceeds to Step S7.

In Step S6, the torque estimated value Tex1 by the above first torque estimation equation is set to the torque Tex of the expander 23, and the process proceeds to Step S8.

In Step S7, the torque estimated value Tex2 by the above second torque estimation equation is set to the torque Tex of the expander 23, and the process proceeds to Step S8.

In Step S8, the load torque $T_{PL}$ of the pump 25 calculated in Step S2 is subtracted from the torque Tex of the expander 23 set in Step S6 or S7 to calculate the torque Tpex of the pump integrated expander 28, i.e., the output Tr (=Tex−$T_{PL}$) of the Rankine cycle device 2.

On the other hand, when the electromagnetic clutch 34 is OFF in Step S1, the process proceeds to Step S9, in which the output torque Tr of the Rankine cycle device 2A is taken to be "0". Instead of the output torque Tr of the Rankine cycle device 2A being taken to be "0", a rotational load (Rankine cycle device 2A+transmission mechanism 3A) at the time that the electromagnetic clutch 34 is OFF is stored in advance, and the stored rotational load may be used as the output torque Tr of the Rankine cycle device 2A.

Then, in Step S10, the output torque Tr of the Rankine cycle device 2A calculated in Step S8 or set in Step S9 is output to the engine control unit 12. The processes from Steps S1 to S9 are executed by the output calculation part 42, but the process of Step S10, i.e., the output of the output torque Tr of the Rankine cycle device 2A to the engine control unit 12 may be executed by the output calculation part 42 or the output part (not shown) (i.e., component other than the output calculation part 42) of the control unit 4A.

Here, the output control of the engine 10 executed by the engine control unit 12 to which the output torque Tr of the Rankine cycle device 2A is input, will be described.

The engine control unit calculates the torque (required torque of the vehicle) required for the vehicle, based on the operating conditions (engine rotational speed Ne, accelerator operation amount by a driver, vehicle speed, etc.) of the engine 10, and subtracts the output torque Tr of the Rankine cycle device 2A from the calculated vehicle required torque to thereby set a target torque of the engine 10. Then, the engine control unit controls a fuel injection amount or the like so as to realize the set target torque of the engine 10. Thus, it is possible to appropriately control the output of the engine 10 according to the output (assist torque when the output is "positive" or load torque when the output is "negative") of the Rankine cycle device 2A.

When an electric motor capable of assisting the output of the engine 10 is being mounted on the vehicle, an electric motor control unit (not shown) can be configured to control the electric motor in such a manner that it cancels the "negative" output torque Tr of the Rankine cycle device 2A when the output torque Tr of the Rankine cycle device 2A is "negative". In this case, the engine control unit 12 can be configured to set the target torque of the engine 10 in the above-described manner when the output torque Tr of the Rankine cycle device 2A is "0" or more, and execute fuel injection control or the like, based on the set target torque of the engine 10.

In the present embodiment, the Rankine cycle device 2A is operated in two states: the state in which the bypass valve 27 is open to prevent the refrigerant from flowing through the expander 23, and the state in which the bypass valve 27 is closed to allow the refrigerant to flow through the expander 23. Thus, when the Rankine cycle device 2A is operated in the different states, it is difficult to accurately estimate the torque of the expander 23, and ultimately, the output torque Tr of the Rankine cycle device 2A, by using only one estimation method, as in the conventional technique.

In this regard, in the present embodiment, the torque estimation portion 421 has the two torque estimation equations: the first torque estimation equation corresponding to the state in which the bypass valve 27 is open and the second torque estimation equation corresponding to the state in which the bypass valve 27 is closed. Thus, the waste heat utilization device 1A can accurately estimate the torque of the expander 23, and ultimately, the output torque Tr of the Rankine cycle device 2A, regardless of whether the bypass valve 27 is in the open or closed state. As a result, the engine control unit 12 is capable of properly controlling the output of the engine 10.

In particular, in the present embodiment, the larger one of the torque estimated value Tex1 by the above first torque estimation equation and the torque estimated value Tex2 by the above second torque estimation equation is selected as the torque Tex of the expander 23. Thus, the minimum value of the torque estimated value of the expander is substantially limited, and the torque estimated value of the expander 23 is prevented from being estimated to be excessively small, not only in the state in which the bypass valve is open, but also immediately after the bypass valve 27 is closed. As a result, the estimation accuracy of the torque of the expander 23, and ultimately, the output torque Tr of the Rankine cycle device 2A, is improved, and proper control of the engine 10 is possible.

Next, modifications of the above embodiment will be described by way of examples.

Modification 1

In the above embodiment, the torque estimation portion 421 estimates the torque of the expander 23 on the basis of the refrigerant pressure PU on the high pressure side of the Rankine cycle device 2A, the refrigerant pressure PD on the low pressure side of the Rankine cycle device 2A, and the rotational speed Nex of the expander 23.

It is, however, not limited thereto, and more simply, the torque estimation portion 421 may estimate the torque of the expander 23, based on the refrigerant pressure PU on the high pressure side and the refrigerant pressure PD on the low pressure side.

In this case, the above equations (1) and (2) may be replaced with the following equations (3) and (4). Of course, the following equations (3) and (4) can also be expressed like the above (1)' and (2)' using the refrigerant pressure difference (PU-PD). As with the above embodiment, even if done in this way, the torque estimated value of the expander 23 is prevented from being calculated excessively smaller, particularly when the bypass valve 27 is open (however, the estimation accuracy is slightly degraded as compared with the above embodiment).

$$Tex1 = -M_{11} \cdot PU + M_{12} \cdot PD - K_5 \quad (3)$$

$$Tex2 = M_{13} \cdot PU - M_{14} \cdot PD - K_6 \quad (4)$$

where $(-M_{11})$, $M_{12}$, $M_{13}$ and $(-M_{14})$ are coefficients, and $(-K_5)$ and $(-K_6)$ are constants.

Furthermore, the torque estimation portion 421 may be configured to estimate the torque (in particular, the torque of the expander 23 in the state in which the bypass valve 27 is closed) of the expander 23 in consideration of the refrigerant temperature on the inlet side of the expander 23. This is because as the refrigerant temperature on the inlet side of the expander 23 increases, even if the refrigerant pressure PU on the high pressure side of the Rankine cycle device 2A, the refrigerant pressure PD on the low pressure side of the Rankine cycle device 2A, and the rotational speed Nex of the expander 23 are the same, an enthalpy change at isoentropic expansion becomes large and the torque of the expander 23 also becomes large. In this case, it is considered that, for example, a correction term based on the refrigerant temperature on the inlet side of the expander 23 or a value correlated with this, is added to the above second torque estimation equation. As the value correlated with the refrigerant temperature on the inlet side of the expander 23, for example, the cooling water temperature of the engine 10, the refrigerant temperature on the outlet side of the expander 23, and the surface temperature of the expander 23 are applicable. By further taking into consideration the refrigerant temperature on the inlet side of the expander 23 in this way, the torque of the expander 23 (in particular, the torque of the expander 23 in the state in which the bypass valve 27 is closed) can be estimated more accurately.

Modification 2

Furthermore, in the above embodiment, the torque Tex of the expander 23 and the load torque $T_{PL}$ of the pump 25 are separately calculated, and the output calculation part 42 calculates the torque Tpex (i.e., the output torque Tr of the Rankine cycle device 2A) of the pump integrated expander 28 using these calculated values. The embodiment is, however, not limited thereto.

As described above, the load torque $T_{PL}$ of the pump 25 is calculated based on the difference (refrigerant pressure difference) $\Delta P$ between the refrigerant pressure PU on the high pressure side and the refrigerant pressure PD on the low pressure side, and the rotational speed Np of the pump 25. Since, however, the rotational speed Nex of the expander is equal to the rotational speed Np of the pump in the pump integrated expander, the torque estimation portion 421 can also be configured to directly calculate (estimate) the torque Tpex of the pump integrated expander 28, i.e., the output torque Tr of the Rankine cycle device 2A. In this case, for example, in the first and second torque estimation equations, the coefficients $(-M_3, -M_6, -M_8$ and $-M_{10})$ and constants $(-K_1$ to $-K_4)$ multiplied to the rotational speed Nex of the expander may be appropriately adjusted.

Figure 4:
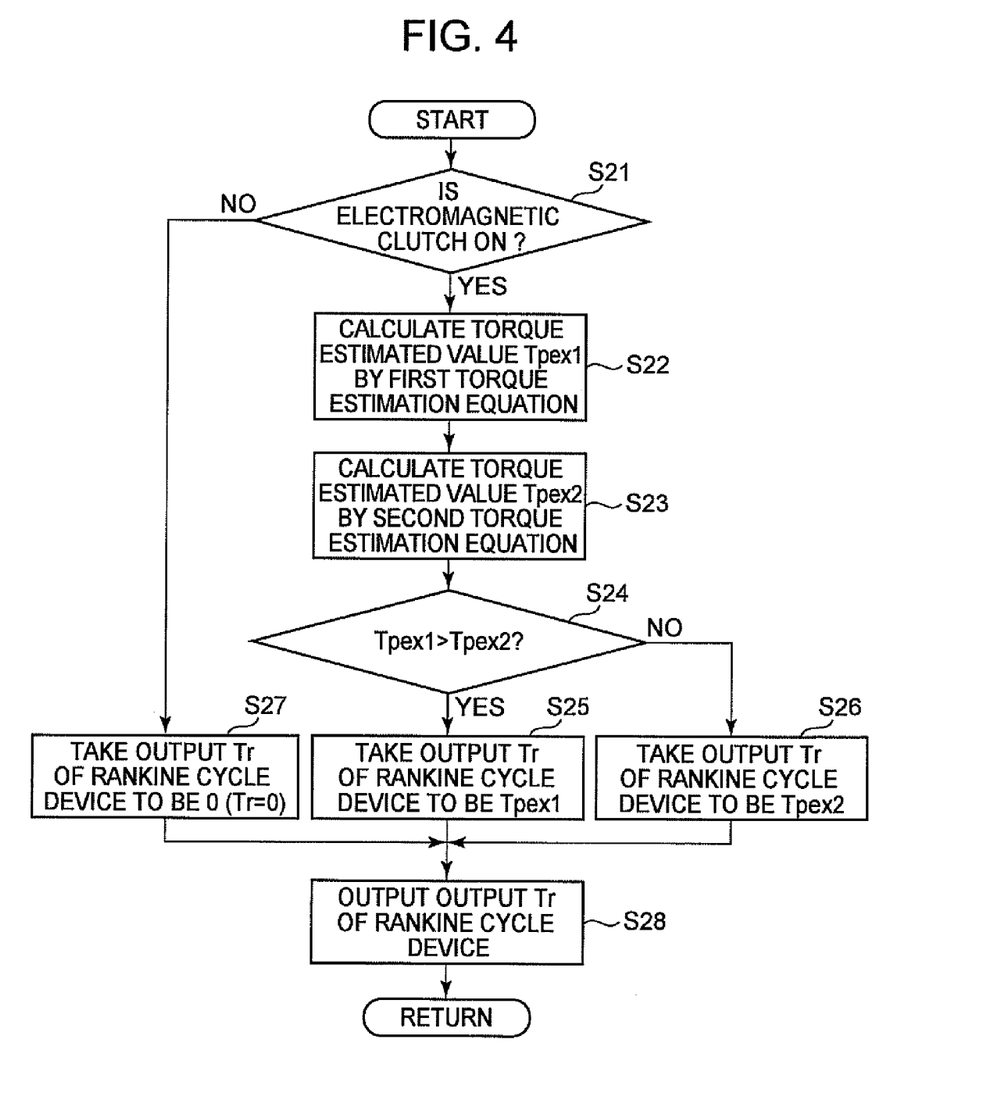
FIG. 4 is a flowchart illustrating another example of a process for calculating the output of the Rankine cycle engine.

When the torque estimation portion 421 is configured to estimate the torque Tpex of the pump integrated expander 28, the pump load calculation portion 422 becomes unnecessary, and the control unit 4A (output calculation part 42) executes, for example, a process shown in the flowchart of FIG. 4 instead of the process shown in the flowchart of FIG. 3.

In FIG. 4, in Step S21, it is determined whether the electromagnetic clutch 34 is ON. If the electromagnetic clutch 34 is ON, the process then proceeds to Step S22. If the electromagnetic clutch 34 is OFF, the process then proceeds to Step S27, in which the output torque Tr of the Rankine cycle device 2A is taken to be "0".

In Step S22, a torque estimated value Tpex1 of the pump integrated expander 28 is calculated by the above first torque estimation equation. In Step S23, a torque estimated value Tpex2 of the pump integrated expander 28 is calculated by the above second torque estimation equation.

In Step S24, the torque estimated value Tpex1 by the above first torque estimation equation and the torque estimated value Tpex2 by the above second torque estimation equation are compared with each other. If Tpex1>Tpex2, the process then proceeds to Step S25, in which the torque estimated value Tpex1 by the above first torque estimation equation is taken to be the output Tr of the Rankine cycle device. If Tpex1≤Tpex2, the process then proceeds to Step S26, in which the torque estimated value Tpex2 by the above second torque estimation equation is taken to be the output Tr of the Rankine cycle device.

Then, in Step S28, the output torque Tr of the Rankine cycle device 2A set in Step S25, S26 or S27 is output to the engine control unit 12.

Modification 3

Furthermore, the torque estimation portion 421 may use a predetermined value Ts determined in advance, instead of the calculation of the torque estimated value Tex1 of the expander 23 by the above first torque estimation equation. The predetermined value Ts is a "negative" constant value. It is possible to use a torque estimated value at the time tb (when the refrigerant pressure difference $\Delta P = \Delta Ps$) shown in FIG. 2 (b), for example. This is because a torque variation width of the expander in the state in which the bypass valve 27 is open is much smaller than that in the state in which the bypass valve 27 is closed. In this case, the torque estimation portion 421 (or output calculation part 42) selects the larger one of the torque estimated value Tex2 by the above second torque estimation equation and the above predetermined value ("negative" constant value) Ts as the torque Tex of the expander 23. If done in this way, as compared with the above embodiment, there is an advantage in that the computational load can be reduced, although the estimation accuracy is slightly reduced.

Modification 4

Furthermore, in the above embodiment, the control unit 4A (output calculation part 42 or torque estimation portion 421) does not determine the open or closed state of the bypass valve 27 (refer to FIG. 3), but may determine the open or closed state of the bypass valve 27 and estimate the torque of the expander 23 according to the open or closed state of the bypass valve 27.

In this case, the control unit 4A (output calculation part 42 or torque estimation portion 421) can be configured to select the maximum value of the torque estimated value Tex1 by the above first torque estimation equation and the torque estimated value Tex2 by the above second torque estimation equation such as described above to thereby set the torque Tex of the expander 23, for example, when the bypass valve 27 is closed, and configured to set the torque estimated value Tex1 by the above first torque estimation equation immediately as the torque Tex of the expander 23 when, on the other hand, the bypass valve 27 is open (the same applies even to FIG. 4).

Modification 5

Furthermore, the control unit 4A (output calculation part 42 or torque estimation portion 421) may store the predetermined value ΔPs (refrigerant pressure difference at the time tb) shown in FIG. 2 in advance. In this case, for example, the torque estimation portion 421 can be configured to determine whether the refrigerant pressure difference ΔP (PU−PD) is greater than or equal to the above predetermined value ΔPs and to estimate the torque of the expander 23 by the above second torque estimation equation when the pressure difference ΔP is greater than or equal to the above predetermined value ΔPs and to estimate the torque of the expander 23 by the above first torque estimation equation when the refrigerant pressure difference ΔP is less than the above predetermined value ΔPs. It is possible to obtain the same effect as the above embodiment even when done in this way.

Next, a device for utilizing waste heat according to a second embodiment of the present invention will be described.

Figure 5:
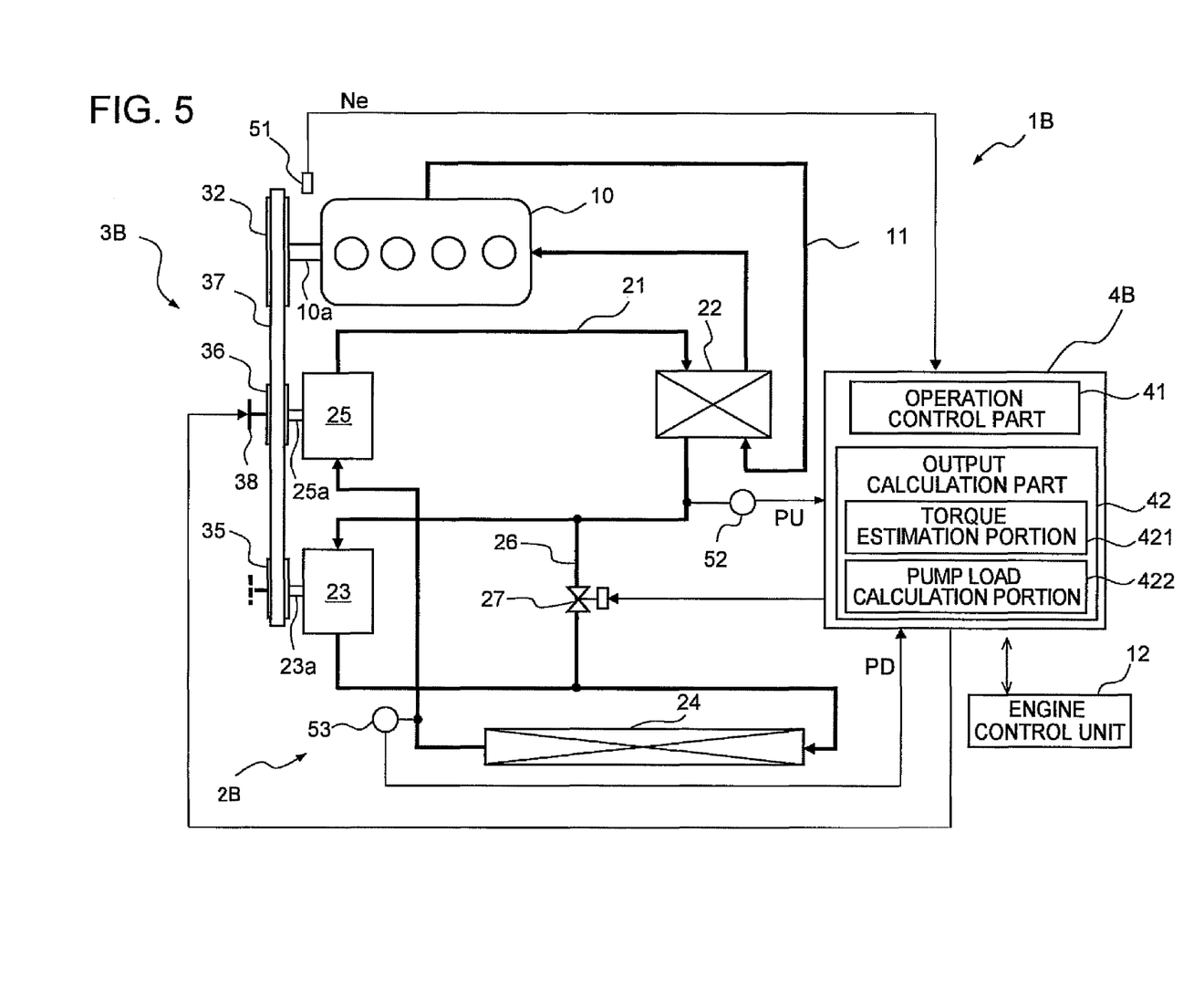
FIG. 5 is a diagram illustrating a schematic structure of a device for utilizing waste heat according to a second embodiment of the present invention.

FIG. 5 shows a schematic structure of a waste heat utilization device 1B according to the second embodiment of the present invention. As with the waste heat utilization device 1A according to the first embodiment, the waste heat utilization device 1B according to the second embodiment is also configured to include a Rankine cycle device 2B, a transmission mechanism 3B that transmits the output torque Tr of the Rankine cycle device 2B to an engine 10, and a control unit 4B that controls the waste heat utilization device 1B.

A major point of difference from the waste heat utilization device 1A according to the first embodiment resides in that in the waste heat utilization device 1B according to the second embodiment, an expander 23 and a pump 25 that configure the Rankine cycle device 2B are separated from each other. The same reference numerals are used for elements that are the same in the waste heat utilization device 1A according to the first embodiment.

In the Rankine cycle device 2B, the pump 25 is driven by the output of the engine 10 through the transmission mechanism 3B. Therefore, the transmission mechanism 3B has a crank pulley 32 attached to a crank shaft 10a of the engine 10, an expander pulley 35 attached to an output shaft 23a of the expander 23, a pump pulley 36 attached to a rotary (drive) shaft 25a of the pump 25, and a belt 37 wound around the crank pulley 32, the expander pulley 35 and the pump pulley 36. Furthermore, an electromagnetic clutch 38 is provided between the rotary shaft 25a of the pump 25 and the pump pulley 36. The operation of the electromagnetic clutch 38 is controlled by the control unit 4B. An electromagnetic clutch (indicated by a broken line) may be provided between the output shaft 23a of the expander 23 and the expander pulley 35.

As with the first embodiment, for example, when the engine 10 is started, an operation control part 41 of the control unit 4B engages the electromagnetic clutch 38 and drives the pump 25 by the engine 10 to thereby operate the Rankine cycle device 2B. Furthermore, the operation control part 41 opens a bypass valve 27 as needed as with the first embodiment.

As with the first embodiment, an output calculation part 42 of the control unit 4B subtracts a load torque $T_{PL}$ of the pump 25 calculated by a pump load calculation portion 422 from a torque Tex of the expander 23 estimated by a torque estimation portion 421 to calculate an output torque Tr of the Rankine cycle device 2B. In the present embodiment, a rotational speed Nex of the expander 23 is calculated based on a rotational speed Ne of the engine 10 and a pulley ratio between the crank pulley 32 and the expander pulley 35. A rotational speed Np of the pump 25 is calculated based on the rotational speed Ne of the engine 10 and a pulley ratio between the crank pulley 32 and the pump pulley 36.

As with the waste heat utilization device 1A according to the first embodiment, the waste heat utilization device 1B according to the second embodiment can also accurately estimate the torque of the expander 23, and ultimately, the output torque Tr of the Rankine cycle device 2B, regardless of whether the bypass valve is in the open or closed state. It is therefore possible to properly control the output of the engine 10.

Those applicable even to the waste heat utilization device 1B according to the second embodiment, of the modifications about the waste heat utilization device 1A according to the first embodiment can be applied as they are.

Next, a device for utilizing waste heat according to a third embodiment of the present invention will be described.

Figure 6:
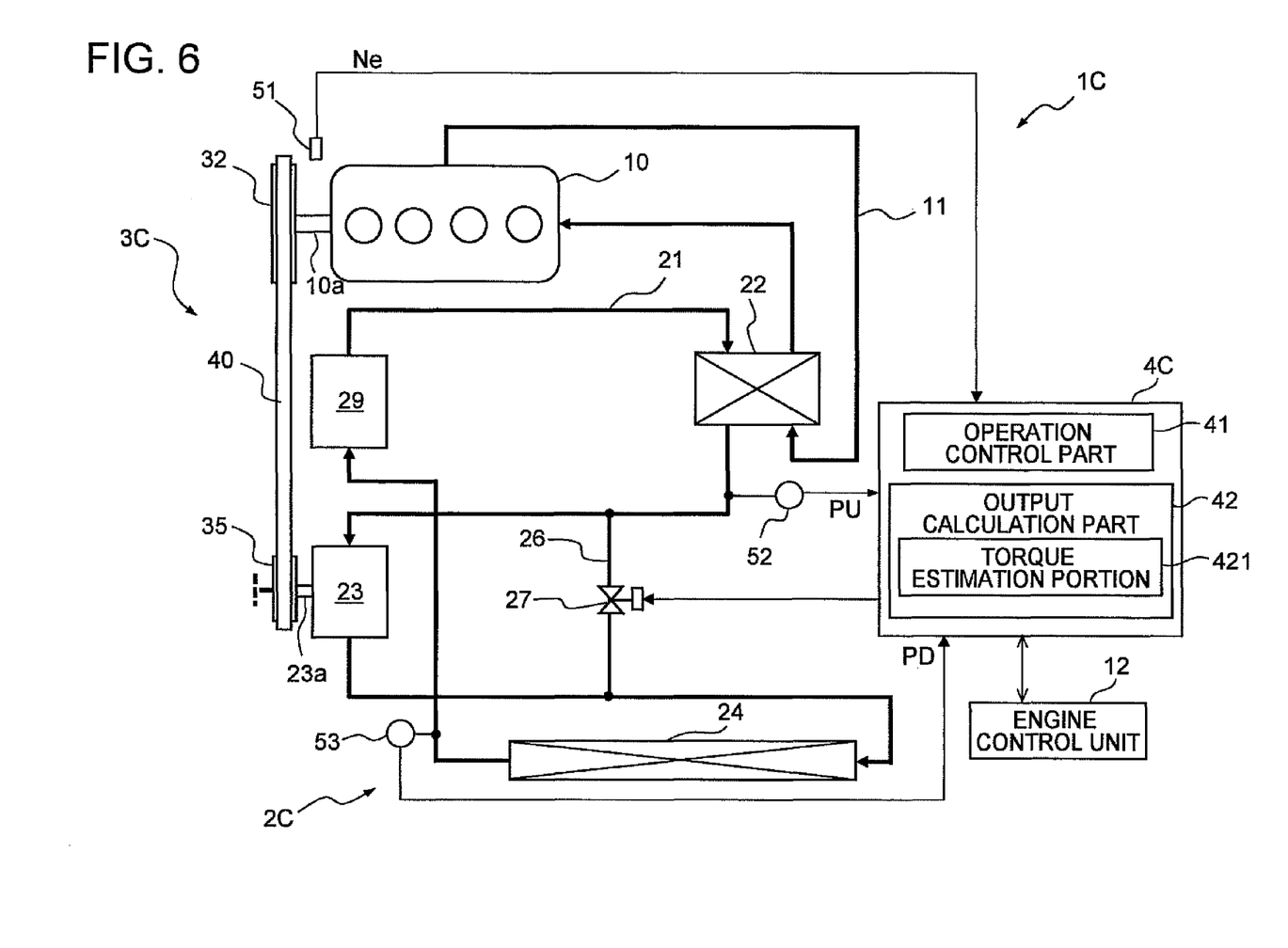
FIG. 6 is a diagram illustrating a schematic structure of a device for utilizing waste heat according to a third embodiment of the present invention.

FIG. 6 shows a schematic structure of a waste heat utilization device 1C according to the third embodiment of the present invention. As with the waste heat utilization devices 1A and 1B according to the first and second embodiments, the waste heat utilization device 1C according to the third embodiment is also configured to include a Rankine cycle device 2C, a transmission mechanism 3C that transmits the output torque of the Rankine cycle device 2C to an engine 10, and a control unit 4C that controls the entirety of the waste heat utilization device 1C.

A major point of difference from the waste heat utilization device 1B according to the second embodiment resides in that in the waste heat utilization device 10 according to the third embodiment, the pump that configures the Rankine cycle device 2C is not the mechanical pump 25, but serves as an electric pump 29 driven by power supplied from a battery (not shown). The operation of the electric pump 29 is controlled by the control unit 4C. The same reference numerals are used for elements that are the same as those of the waste heat utilization devices 1A and 1B according to the first and second embodiments.

In the waste heat utilization device 1C according to the third embodiment, the transmission mechanism 3C has a crank pulley 32 attached to a crank shaft 10a of the engine 10, an expander pulley 35 attached to an output shaft 23a of an expander 23, and a belt 40 wound around the crank pulley 32 and the expander pulley 35. An electromagnetic clutch (indicated by a broken line) may be provided between the output shaft 23a of the expander 23 and the expander pulley 35.

As with the first and second embodiments, for example, when the engine 10 is started, an operation control part 41 of the control unit 4C drives the electric pump 29 to operate the Rankine cycle device 2C. Furthermore, the operation control part 41 opens a bypass valve 27 as needed as with the first and second embodiments.

In the present embodiment, the Rankine cycle device 2C uses the electric pump 29, which does not become a load of the engine 10 or the expander 23. Therefore, an output calculation part 42 of the control unit 4C does not have a pump load calculation portion, unlike in the first and second embodiments. That is, the output calculation part 42 sets the torque of the expander 23 estimated by the torque estimation portion 421 as the output torque of the Rankine cycle device 2C. As a result, in the present embodiment, Step S2 in the flowchart of FIG. 3 becomes unnecessary. In Step S8, the torque Tex of the expander set in Step S6 or S7 is taken to be the output torque Tr of the Rankine cycle device 2C as it is.

As with the waste heat utilization devices 1A and 1B according to the first and second embodiments, the waste heat utilization device 1C according to the third embodiment is also capable of accurately estimating the torque of the expander 23, and ultimately, the output torque Tr of the Rankine cycle device 2B, regardless of the open or closed state of the bypass valve and properly controlling the output of the engine 10.

Those applicable even to the waste heat utilization device 10 according to the third embodiment, of the modifications about the waste heat utilization device 1A according to the first embodiment can be applied as they are.

Although the embodiments and modifications of the present invention have been described above, the present invention is not limited thereto, and further modifications and changes can be made based on the technical concept of the present invention.

For example, in the above embodiments, the heat exchange is conducted between the cooling water of the engine and the refrigerant in the evaporator of the Rankine cycle device, but the evaporator can also be configured such that the heat exchange is performed between the exhaust of the engine and the refrigerant. Furthermore, the control units 4A through 4C and the engine control unit 12 may be mounted on the vehicle as one electronic control unit.

REFERENCE SYMBOL LIST 1A, 1B, 1C Waste heat utilization device
2A, 2B, 2C Rankine cycle device
3A, 3B, 3C Transmission mechanism
4A, 4B, 4C Control unit
10 Engine
12 Engine control unit
21 Circulation passage of refrigerant
22 Evaporator
23 Expander
24 Condenser
25 Pump
26 Expander bypass passage
27 Bypass valve
28 Pump integrated expander
29 Electric pump
42 Output calculation part
421 Torque estimation portion
422 Pump load calculation portion

The invention claimed is:

1. A device for utilizing waste heat from an engine, comprising:
a Rankine cycle device provided in a circulation passage of a refrigerant with an evaporator that evaporates the refrigerant by heating the refrigerant by the waste heat of the engine, an expander that expands the refrigerant which has passed through the evaporator to thereby generate power, a condenser that condenses the refrigerant which has passed through the expander, and a pump that delivers the refrigerant which has passed through the condenser to the evaporator, and provided with an expander bypass passage that allows the refrigerant to circulate while bypassing the expander, and a bypass valve that opens and closes the expander bypass passage;
a transmission mechanism that transmits an output torque of the Rankine cycle device to the engine; and
a calculation processing unit that calculates the output torque of the Rankine cycle device, based on a torque of the expander and outputs the calculated output torque of the Rankine cycle device to an engine control unit,
wherein the engine control unit sets a target torque of the engine from the output torque of the Rankine cycle and a required torque calculated based on operating conditions of the engine, and controls a fuel injection amount into the engine based on the set target torque of the engine,
wherein the calculation processing unit estimates a torque of the expander, based on a refrigerant pressure on the high pressure side of the Rankine cycle device and a refrigerant pressure on the low pressure side thereof, and calculates the output torque of the Rankine cycle device based on the estimated torque of the expander, and
wherein the estimated torque of the expander is limited by a predetermined negative value to adjust the bypass valve to open or close the expander bypass passage.

2. A device for utilizing waste heat from an engine, comprising:
a Rankine cycle device provided in a circulation passage of a refrigerant with an evaporator that evaporates the refrigerant by heating the refrigerant by the waste heat of the engine, an expander that expands the refrigerant which has passed through the evaporator to thereby generate power, a condenser that condenses the refrigerant which has passed through the expander, and a pump that delivers the refrigerant which has passed through the condenser to the evaporator, and provided with an expander bypass passage that allows the refrigerant to circulate while bypassing the expander, and a bypass valve that opens and closes the expander bypass passage;
a transmission mechanism that transmits an output torque of the Rankine cycle device to the engine; and
a calculation processing unit that calculates the output torque of the Rankine cycle device and outputs the calculated output torque of the Rankine cycle device to an engine control unit that performs output control of the engine,
wherein the engine control unit sets a target torque of the engine from the output torque of the Rankine cycle and a required torque calculated based on operating conditions of the engine, and controls a fuel injection amount into the engine based on the set target torque of the engine,
wherein the calculation processing unit has:
a first torque estimation portion that estimates a torque of the expander in a state in which the bypass valve is open, based on a refrigerant pressure on the high pressure side of the Rankine cycle device and a refrigerant pressure on the low pressure side thereof; and a second torque estimation portion that estimates a torque of the expander in a state in which the bypass valve is closed, based on the refrigerant pressure on the high pressure side of the Rankine cycle device and the refrigerant pressure on the low pressure side thereof, and wherein the output torque of the Rankine cycle device is calculated based on the torque estimated value by the first torque estimation portion or the torque estimated value by the second torque estimation portion to adjust the bypass valve to open or close the expander bypass passage.

3. The device for utilizing waste heat from the engine, according to claim 2, wherein the calculation processing unit calculates the output torque of the Rankine cycle device, based on a larger value of the torque estimated value by the first torque estimation portion and the torque estimated value by the second torque estimation portion.

4. The device for utilizing waste heat from the engine, according to claim 2, wherein the calculation processing unit determines whether the bypass valve is open or closed, when the bypass valve is open, calculates the output torque of the Rankine cycle device, based on the torque estimated value by the first torque estimation portion, and when the bypass valve is closed, calculates the output torque of the Rankine cycle device, based on a larger value of the torque estimated value by the first torque estimation portion and the torque estimated value by the second torque estimation portion.

5. The device for utilizing waste heat from the engine, according to claim 2, wherein the pump is driven by the engine through the transmission mechanism, and wherein the calculation processing unit subtracts a load torque for driving the pump from the torque estimated value by the first torque estimation portion or the torque estimated value by the second torque estimation portion to calculate the output torque of the Rankine cycle device.

6. The device for utilizing waste heat from the engine, according to claim 2, wherein the first torque estimation portion and the second torque estimation portion estimate the torque of the expander, further based on a rotational speed of the expander.

7. The device for utilizing waste heat from the engine, according to claim 2, wherein the expander and the pump are configured as a pump integrated expander integrated through a common rotary shaft, and the pump is driven by the engine through the transmission mechanism or driven by the expander, wherein the first torque estimation portion estimates a torque of the pump integrated expander in the state in which the bypass valve is open, based on the refrigerant pressure on the high pressure side of the Rankine cycle device, the refrigerant pressure on the low pressure side of the Rankine cycle, and a rotational speed of the expander, and wherein the second torque estimation portion estimates a torque of the pump integrated expander in the state in which the bypass valve is closed, based on the refrigerant pressure on the high pressure side of the Rankine cycle device, the refrigerant pressure on the low pressure side of the Rankine cycle, and a rotational speed of the expander.

8. The device for utilizing waste heat from the engine, according to claim 2, wherein the second torque estimation portion estimates the torque of the expander, further based on a refrigerant temperature of an inlet of the expander or a value correlated therewith.

* * * * *